United States Patent [19]

Truchet

[11] Patent Number: 4,611,831
[45] Date of Patent: Sep. 16, 1986

[54] CONNECTION DEVICE FOR SIMULTANEOUSLY CONNECTING A SERIES OF CIRCUITS

[75] Inventor: Gaston Truchet, Faverges, France

[73] Assignee: S.A. Des Etablissements Staubli, Faverges, France

[21] Appl. No.: 741,430

[22] Filed: Jun. 5, 1985

[30] Foreign Application Priority Data

Jun. 14, 1984 [FR] France .................... 84 09530

[51] Int. Cl.[4] .............................................. F16L 35/00
[52] U.S. Cl. .................................. 285/26; 285/137.1; 285/317
[58] Field of Search ............... 285/85, 26, 29, 317, 285/360, 361, 137.1, 191, 364, 310

[56] References Cited

U.S. PATENT DOCUMENTS

| 408,434 | 8/1889 | Pringle | 285/310 |
| 2,728,895 | 12/1955 | Quackenbush et al. | 285/85 X |
| 3,960,393 | 6/1976 | Hosokawa et al. | 285/137 R |
| 4,555,130 | 11/1985 | McClain | 285/26 |

Primary Examiner—Dave W. Arola
Attorney, Agent, or Firm—Dowell & Dowell

[57] ABSTRACT

A connection device having two interfitting support pieces for simultaneously connecting multiple fluid circuits. One of the pieces, which bear the male and female elements of the multiple fluid connections to be joined, is provided with a lock capable of rotating and compressing axially against a spring. This lock bears two lateral pins which cooperate with ramps made in a bushing carried by support the other support piece.

2 Claims, 6 Drawing Figures

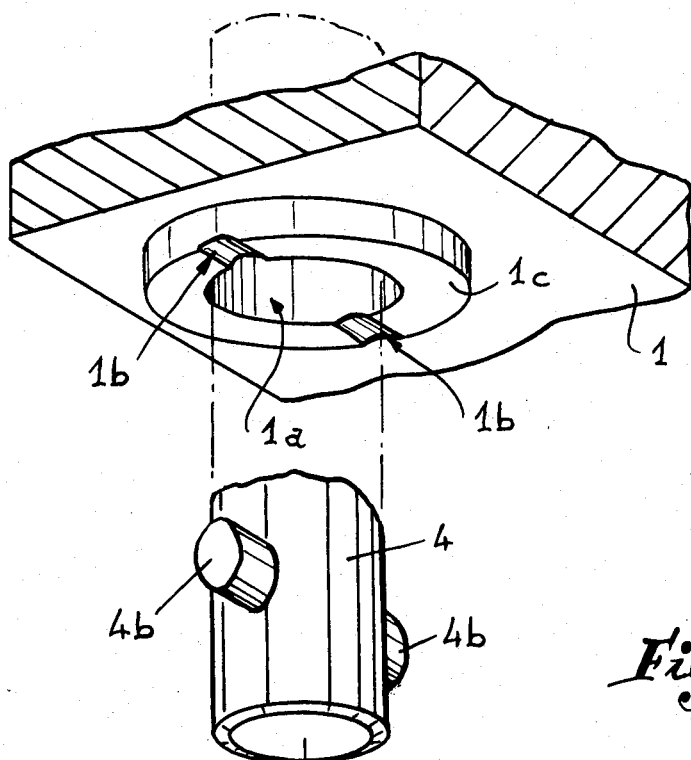
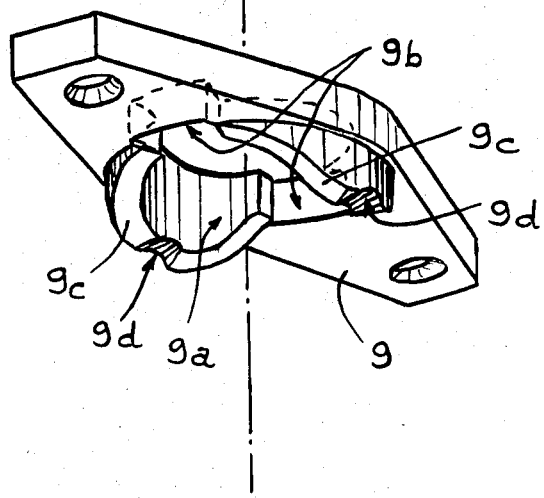
Fig. 2

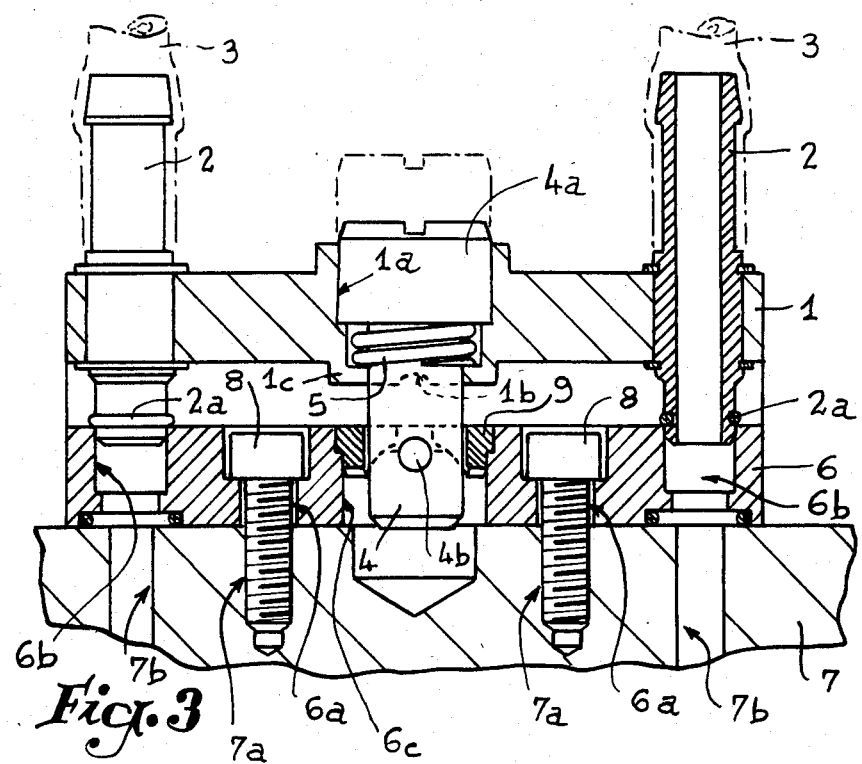
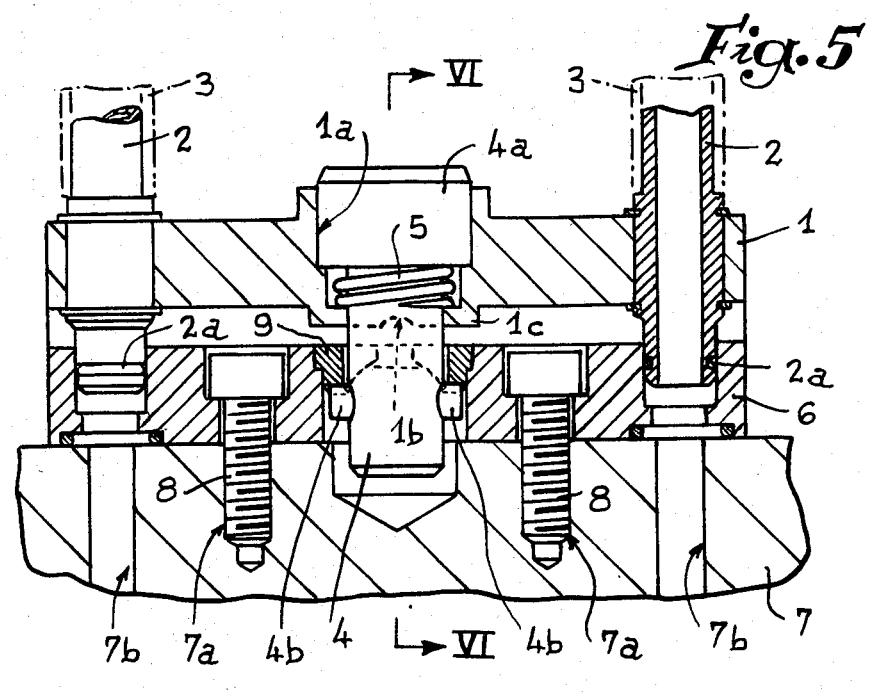

CONNECTION DEVICE FOR SIMULTANEOUSLY CONNECTING A SERIES OF CIRCUITS

The present invention relates to connection devices adapted to enable a series of independent fluid circuits to be connected simultaneously.

Devices of this type, commonly referred to as "multiple connections", may be used for many different applications, such as, for example, pneumatic or hydraulic installations, and more particularly, water circulation systems for the cooling of injection moulds. In all cases, the connection device is required to be of economical and reliable construction and it must be extremely simple to use, avoiding any trail and error or hesitation by the operator.

It is an object of the invention to provide a device of this type which achieves particularly well to the objectives set forth hereinabove.

The device according to the invention comprises, in manner known per se, two interfitting pieces forming supports for the male elements and female elements, respectively, of the elementary connections associated with the different circuits to be connected, these elements being adapted to fit hermetically in one another and to be retained in this position by the means which retain assembly of the two pieces or supports.

Its originality resides principally in the fact that the assembly means comprise, on the one hand, a twist lock provided with two opposite lateral pins which is mounted on one of the pieces so as to move axially against elastic return means, and, on the other hand, a locking bushing which is carried by the second piece and whose opening presents two diametrically opposite notches to allow the passage of the pins of the lock when the latter is pushed in the said opening. The bushing then retains this lock once the latter has been rotated angularly.

The invention will be more readily understood on reading the following description with reference to the accompanying drawings, in which:

FIG. 2 is a view in perspective illustrating the arrangement of the lock means for assembling the two principal pieces of the device of FIG. 1.

Figure 1:
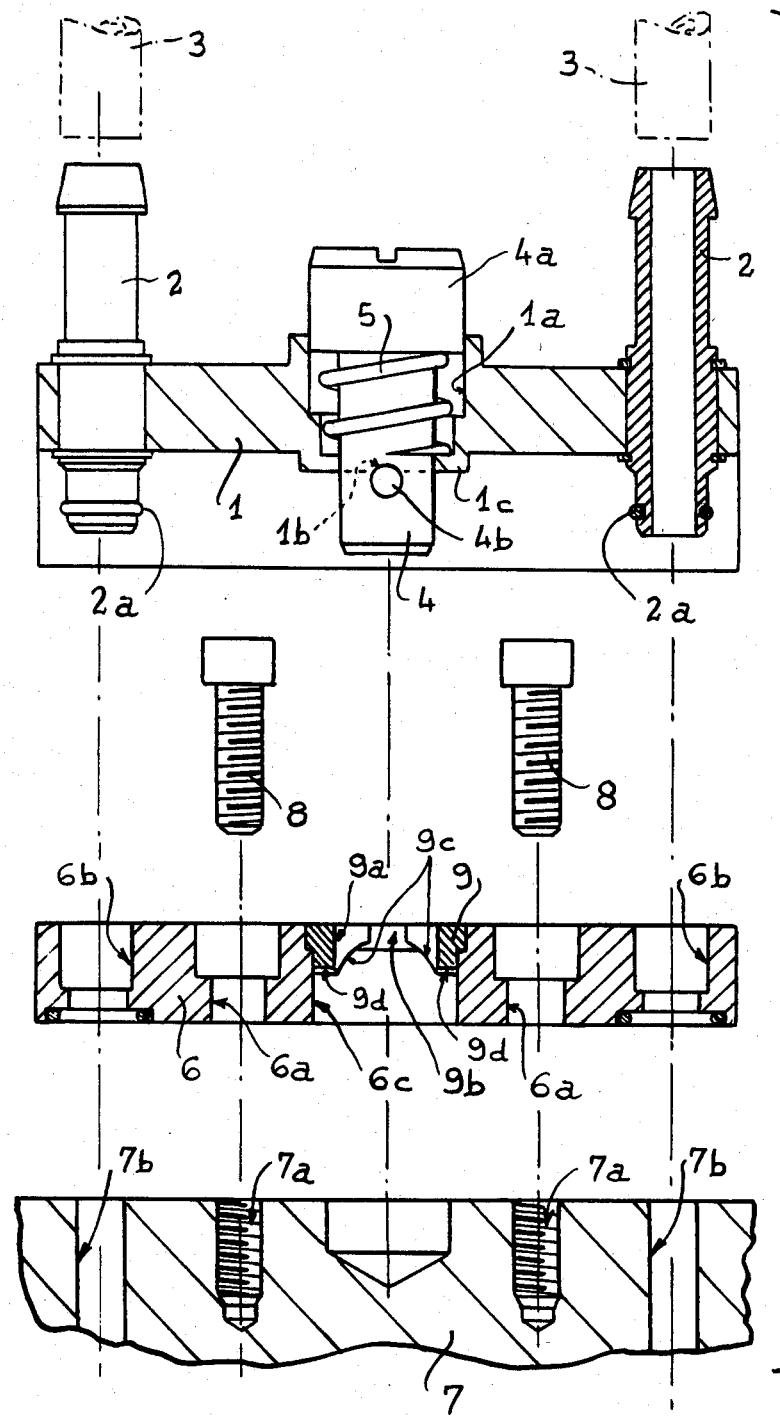
FIG. 1 is an exploded schematic axial section showing a connection device according to the invention, prior to assembly thereof.

FIG. 3 reproduces FIG. 1 after assembly of the two pieces and attachment of the two fluid carrying elements.

Figure 4:
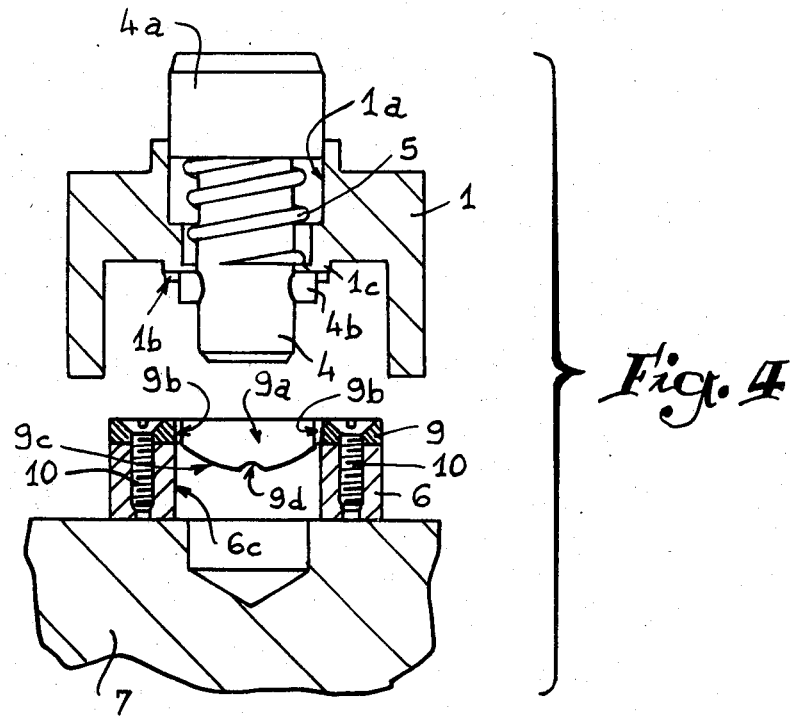

FIG. 4 is an exploded transverse section illustrating the mutual approach of the two pieces of the device.

FIG. 5 reproduces FIG. 3 after rotation of the lock.

Figure 6:
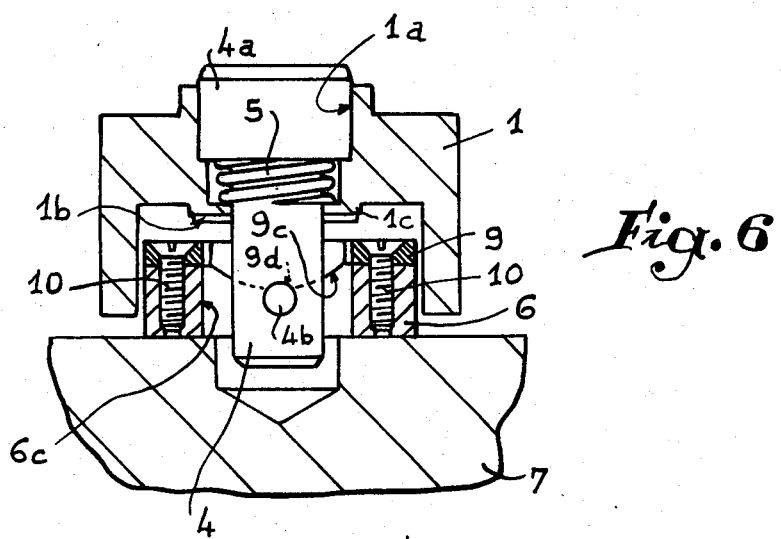

FIG. 6 is a transverse section along plane VI—VI of FIG. 5.

Referring now to the drawings, reference 1 in FIG. 1 designates a metal piece of cross-section in the form of a downwardly open U, FIG. 4. On this first support piece 1 are fixed the male elements 2 of the individual connections of the device envisaged; each of these elements 2 is constituted by a pipe of which the base, projecting inside the U-section of the piece 1, bears an O-ring 2a, whilst the top is profiled to receive a flexible hose 3. There may be any number of these elements 2 and their arrangement on piece 1 may vary to a very wide extent.

A bore 1a with three diameters is made in the central part of the piece 1, inside which bore is engaged a cylindrical lock 4 provided with a projecting head 4a for manipulating it. At the other end it has two diametrically opposite lateral pins 4b. A spring 5, interposed between one of the shoulders of the bore 1a and the head 4a of the lock 4, pushes the latter yieldably upwards, thus tending to maintain the pins 4b of the latter in recesses 1b (FIG. 2) made in the end face of a boss 1c, which projects from the piece 1 around the opening of bore 1a.

The device comprises a second support piece, constituted by a rectangular bar 6 (FIG. 1) adapted to be applied against one of the walls 7 of the machine supplied by means of the device in question. It is assumed that the second support piece 6 is fixed by means of screws 8 which pass through holes 6a in said piece and screw in tappings 7a in the wall 7. This piece 6 bears, in principle, the female elements adapted to cooperate with the male elements 2 of the support piece 1, these female elements being formed in the present case by simple bores 6b, the number and arrangement thereof being identical to those of said male elements 2; in register with each bore 6b, the wall 7 has a channel 7b hollowed out therein, connected to the corresponding circuit to be supplied.

The centre of piece 6 is bored to form an opening 6c in the upper part of which is mounted a bushing 9 (FIGS. 1 to 3), fixed in place in any appropriate manner, for example with the aid of two screws 10 (FIG. 4). As may be seen more particularly in FIG. 2, the opening 9a of this bushing comprises two lateral notches 9b diametrically opposite each other, the depth of these notches being very slightly greater than the length of the pins 4b of the lock 4. Furthermore that part of the bushing 9 which is engaged inside the opening 6c is profiled to present two ramps 9c disposed on either side of the notches 9b, the culminating point of each ramp 9c lying halfway between the said notches and having a depression or recess 9d hollowed out therein. It will be observed that the notches 9b define a transverse axis oriented parallel to that defined by the two recesses 1b in the boss 1c.

The functioning and mode of using the device described hereinbefore will follow from the foregoing explanations and will be readily understood.

The first support piece 1 with its male connection elements 2 fixed to the flexible hoses 3 is offered by the operator with respect to the second support piece 6 fixed on the wall 7, in the manner shown in FIG. 3, i.e. with the projecting lower part of said elements 2 oriented along the axis of the bores or female connection elements 6b. FIG. 4 shows that this presentation is facilitated by the U-section of the lower part of the first connection piece 1, which profile guides the operator and avoids any trail and error attachement of the pieces.

It suffices for the operator to manipulate the lock 4 by its head 4a, firstly pushing it axially in the direction of piece 6 against spring 5, then rotating it through a quarter turn. As shown in FIGS. 5 and 6, pins 4b enter through notches 9b, then slide along ramps 9c until they are immobilized in the recesses 9d at the end of the angular displacement of the lock. The effect of the axial thrust applied to lock 4 is of course to bring the two pieces 1 and 6 closer by force and thus to cause elements 2 to fit in the female bores 6b.

The two pieces of the device are then rendered securely fast with each other, the spring 5 by acting on lock 4, automatically compensating any clearance. In this assembled position, the male elements 2 are retained hermetically inside the female bores 6b and effect connection of the different circuits.

The two pieces of the device are obviously disconnected by oppositely manipulating the lock 4, spring 5 ensuring the elastic backward movement thereof during the angular rotation, so that the pins 4b, after extraction from the recesses 9d, move along the ramps 9c, pass through the notches 9b to be ultimately retained in the recesses 1b in the boss 1c which will hold them angularly in place until a further operation of connection is carried out.

It is very simple to manipulate the lock 4. In the embodiment described, it has been assumed that the head 4a is provided with a diametrical slot for cooperation with a screwdriver, but it goes without saying that said head may be sectioned so as to be directly manipulated by hand, without a tool.

It must, moreover, be understood that the foregoing description has been given only by way of example and that it in no way limits the domain of the invention which would not be exceeded by replacing the details of execution described by any other equivalent means.

What is claimed is:

1. In a connection device for simultaneously connecting multiple fluid circuits, the connection device having first and second interfitting support pieces carrying mating male and female elements operative to connect said fluid circuits, and the support pieces being maintained in mating position by lock means passing through bore in the pieces, the lock means comprising:

a cylindrical twist lock extending through the bore in the first support piece, the twist lock having a head at one end and having pin means extending transversely across the twist lock near the other end and maintaining the twist lock in the bore with its other end extending toward the second support piece, the first support piece having recesses positioned to receive said pin means, and spring means around the twist lock between its head and the first support piece and yieldably urging the pin means into engagement with the recesses when the twist lock is in a predetermined angular orientation; and a bushing fixed in the bore through the second support piece, the bushing having an opening to pass the twist lock therethrough and the opening having notches located laterally thereof and extending parallel to the opening to pass the pin means through the bushing when the twist lock enters the opening with said predetermined angular orientation, and the bushing having ramps extending from the notches away from the first support piece when mated and terminating in recesses positioned to receive and retain the pin means when the twist lock is inserted through the opening and rotated so that the pin means ride up the ramps into their recesses to compress the spring means.

2. A connecting device as claimed in claim 1, wherein one of said support pieces is formed to provide a U-shaped cross section shaped to receive the second support piece and guide it into mating engagement therewith.

* * * * *